(12) United States Patent
Kang

(10) Patent No.: US 8,049,743 B2
(45) Date of Patent: Nov. 1, 2011

(54) DISPLAY APPARATUS WITH BRIGHTNESS CONTROL FUNCTION

(75) Inventor: Hwa-Young Kang, Suwon-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 880 days.

(21) Appl. No.: 12/021,380

(22) Filed: Jan. 29, 2008

(65) Prior Publication Data

US 2008/0180464 A1 Jul. 31, 2008

(30) Foreign Application Priority Data

Jan. 31, 2007 (KR) .................. 10-2007-0009984

(51) Int. Cl.
G09G 5/00 (2006.01)
(52) U.S. Cl. ........................ 345/207; 345/697
(58) Field of Classification Search .............. 348/207.99–207.11, 333.01, 272, 348/294–324; 345/207, 697
See application file for complete search history.

(56) References Cited

U.S. PATENT DOCUMENTS

| 7,637,430 | B2* | 12/2009 | Hawley et al. ............... 235/454 |
| 2002/0080245 | A1* | 6/2002 | Parulski et al. ............. 348/223 |
| 2003/0030740 | A1* | 2/2003 | Tsujino ....................... 348/333.01 |
| 2004/0252201 | A1* | 12/2004 | Meitav et al. ................ 348/211.3 |
| 2005/0162531 | A1* | 7/2005 | Hsu et al. ..................... 348/222.1 |
| 2005/0218303 | A1* | 10/2005 | Poplin ......................... 250/214 AL |
| 2007/0132873 | A1* | 6/2007 | Hyodo ......................... 348/333.01 |
| 2007/0236590 | A1* | 10/2007 | Harris .......................... 348/308 |
| 2008/0084486 | A1* | 4/2008 | Enge et al. ................... 348/239 |
| 2008/0117319 | A1* | 5/2008 | Jiang et al. ................... 348/273 |
| 2010/0141571 | A1* | 6/2010 | Chiang et al. ................ 345/102 |

FOREIGN PATENT DOCUMENTS

KR 2000-32178 6/2000

* cited by examiner

Primary Examiner — Alexander Eisen
Assistant Examiner — Nelson Lam
(74) Attorney, Agent, or Firm — Cha & Reiter, LLC

(57) ABSTRACT

A display apparatus with a brightness control function is provided, in which a camera portion generates a first detection signal in an image mode by capturing an image of an object by an image sensor according to a first control signal and generates a second detection signal in an illumination mode by detecting external illumination by the same image sensor according to a second control signal. The display displays an image signal, and a controller provides the first control signal to the camera portion in image detection mode, and provides the second control signal to the camera portion in illumination detection mode to control brightness of the display based on the second detection signal received from the camera portion. Only part of the pixels of the image sensor can be used in the illumination detection mode so that additional parts are not required to provide automatic illumination control.

6 Claims, 4 Drawing Sheets

DISPLAY APPARATUS WITH BRIGHTNESS CONTROL FUNCTION

CLAIM OF PRIORITY

This application claims the benefit of priority under 35 U.S.C. §119(a) from a Korean Patent Application filed in the Korean Intellectual Property Office on Jan. 31, 2007 and assigned Ser. No. 2007-9984, the entire disclosure of which is hereby incorporated by reference in its entirety.

BACKGROUND OF THE INVENTION

1. Field of the Invention

The present invention generally relates to a display apparatus. More particularly, the present invention relates to brightness of a display apparatus with a camera portion.

2. Description of the Related Art

There is a variety of display apparatuses currently in use in devices such as portable phones, laptop and notebook computers, Portable Multimedia Players (PMPs), Digital Versatile Disks (DVDs), and MPEG Audio Layer 3 (MP3) players. In particular, the deployment of Digital Multimedia Broadcasting (DMB) is a driving force behind the proliferation of display apparatuses having a moving picture function.

With regard to such display apparatuses, image quality as well as functionality is often linked to the commercial success of the display apparatus, and/or the devices using the display apparatus. Among factors that determine the image quality, appropriate brightness is a significant factor. When brightness is automatically controlled according to external illumination, users' overall satisfaction is enhanced and power is typically saved versus displays that do not automatically adjust brightness.

Conventionally, brightness is typically fixed at a predetermined default level, or a user may set or change a level of desired brightness. Additionally, an illumination sensor is used. Such conventional devices and methods have the following shortcomings.

(1) In the case of having a fixed brightness, unnecessary power is wasted when the external illumination is high. On the other hand, the fixed brightness causes inconvenience in a dark area because sufficient brightness may not be available to comfortably view the display.

(2) When a user sets a desired brightness, it is not easy to set an appropriate brightness value unless he/she is skilled. Also, a user may not set the brightness level until there is an extreme situation, and setting the brightness at that time may actually degrade the viewability when the device is returned to more typical operating conditions and the user doesn't change it back, or does not remember exactly what the previous brightness values were.

(3) When an illumination sensor is additionally used, the cost is increased and the increase of parts in number makes the display apparatus bulky.

Accordingly, there exists a need for a display apparatus that automatically controls brightness according to external illumination without the aid of additional parts.

SUMMARY OF THE INVENTION

An aspect of exemplary embodiments of the present invention is to address at least some of the problems and/or disadvantages described above and to provide at least the advantages described herein below. Accordingly, an aspect of exemplary embodiments of the present invention is to provide a display apparatus for automatically controlling brightness according to external illumination without using additional parts.

In accordance with an aspect of exemplary embodiments of the present invention, there is provided a display apparatus, in which a camera portion generates a first detection signal by capturing an image of an object according to a first control signal and generates a second detection signal by detecting external illumination according to a second control signal, a display displays an image signal. A controller provides the first control signal to the camera portion in image detection mode, and provides the second control signal to the camera portion in illumination detection mode, and controls brightness of the display based on the second detection signal received from the camera portion.

BRIEF DESCRIPTION OF THE DRAWINGS

The above features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF THE INVENTION

The matters defined in the description such as a detailed construction and elements are provided to assist a person of ordinary skill in the art with a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions may be omitted for clarity and conciseness when their inclusion might obscure an artisan's appreciation of the invention with such descriptions of well-known functions and constructions.

Figure 1:
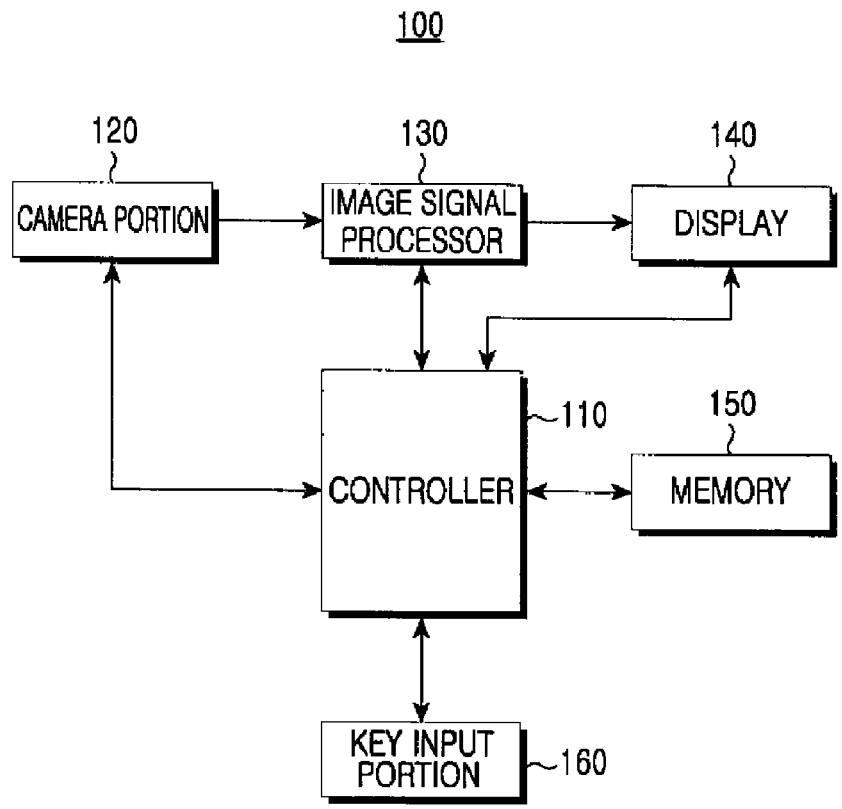
FIG. 1 is a block diagram of a display apparatus according to an exemplary embodiment of the present invention.
Figure 2:
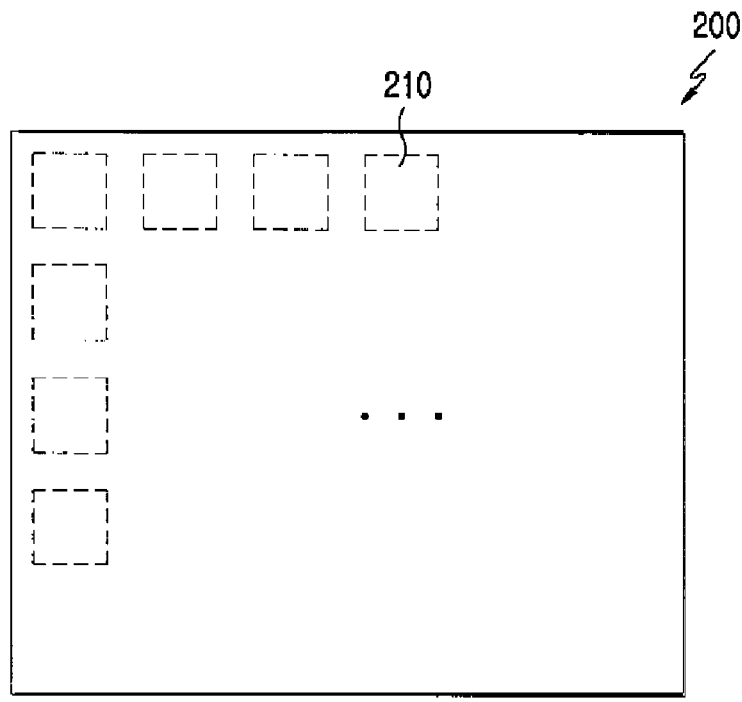
FIG. 2 illustrates an image sensor in the camera portion illustrated in FIG. 1.
Figure 3A:
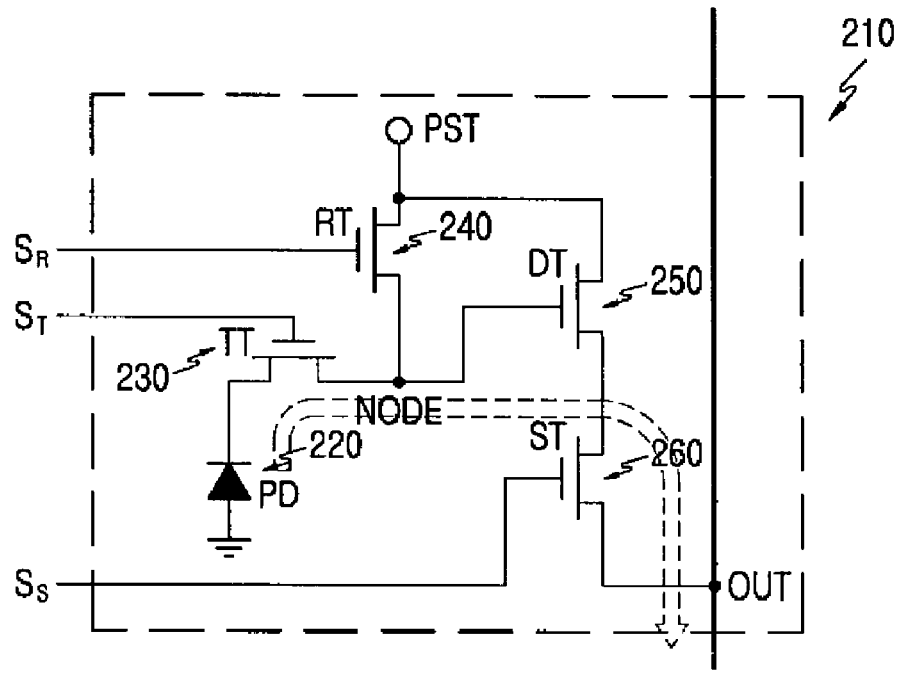
FIGS. 3A and 3B are circuit diagrams of a pixel of the image sensor illustrated in FIG. 2.
Figure 3B:
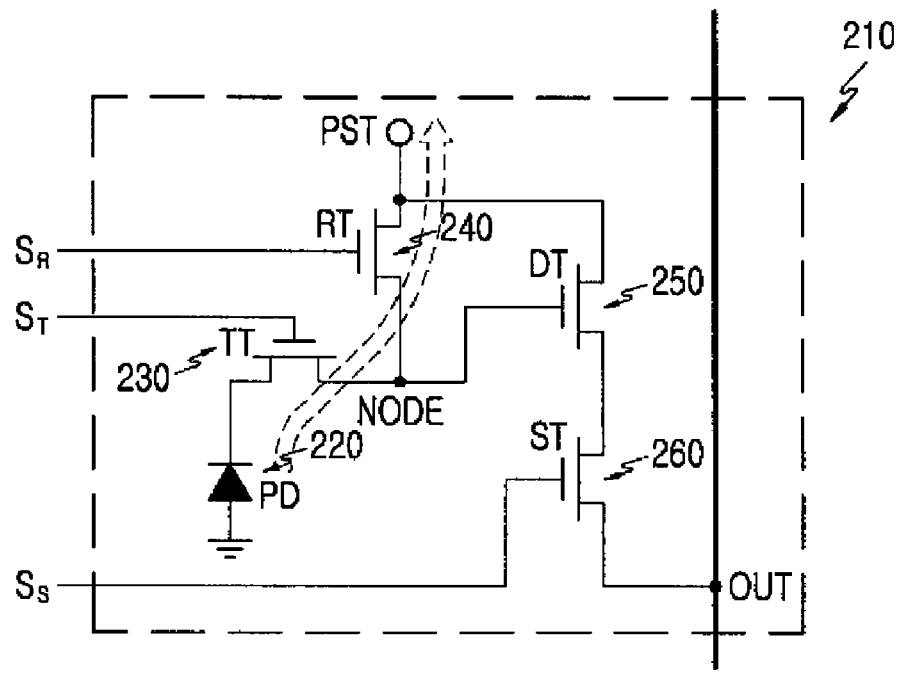

FIG. 1 is a block diagram of a display apparatus according to an exemplary embodiment of the present invention, FIG. 2 illustrates an image sensor in the camera portion illustrated in FIG. 1, and FIGS. 3A and 3B are circuit diagrams of a pixel of the image sensor illustrated in FIG. 2.

Referring to FIGS. 1 to 3A, a display apparatus 100 includes a camera portion 120, an image signal processor 130, a display 140, a memory 150, a key input portion 160, and a controller 110.

The camera portion 120 includes an image sensor 200 (shown in FIG. 2) for generating a first detection signal by capturing an image of an object according to a first control signal and generating a second detection signal by detecting external illumination according to a second control signal. The camera portion 120 may further include an optical system for generating the image of the object and a driving circuit for supplying a necessary voltage to the image sensor 200. Since the configuration of the camera portion 120 is well known, a detailed description of the additional components of the camera portion 120 will not be provided herein. The image sensor 200 can be, for example, a Complementary Metal Oxide Semiconductor (CMOS) image sensor, but a person of ordinary skill in the art understands and appreciates that other types image sensors may be used with the present invention.

The image signal processor 130 converts the first detection signal received from the camera portion 120 to an image signal. The image signal processor 130 typically processes the first detection signal on a frame-by-frame basis and outputs the image signal according to the characteristics of the display 130. Such characteristics may include size, image quality, resolution, etc. When the image signal processor 130 is turned on/off, there is typically output a controlled image signal, and the image signal processor provides information about images or operation statuses to the controller 110.

Still referring to FIG. 1, the display 140 displays the image signal received from the image signal processor 130 or the controller 110. A general Liquid Crystal Display (LCD) can be used as the display 140, which includes a liquid crystal unit and a backlight unit for emitting light to the liquid crystal unit. The display 140 can control its brightness by adjusting the intensity of light emitted from the backlight unit according to a third control signal received from the controller 110. The display 140 can also output operational status information to the controller 110.

The key input portion 160 typically includes a keypad with alphanumerical keys for entering digits and characters and function keys for setting functions. The key input portion 160 outputs key signals corresponding to keys pressed by a user to the controller 110. The key input portion 160 can turn on/off or control the illumination of the keypad under the control of the controller 110.

Still referring to FIG. 1, the memory 150 can typically store a program and/or the data for displaying an image detected by the camera portion 120 on the display 140, as well as may also store one or more of images to be displayed on the display 140 (e.g. menu view, wallpaper, etc.), a program for controlling the brightness of the display 140 according to external illumination, a table listing external illumination values mapped to photocharge measurements, and a table listing brightness values mapped to external illumination values.

The controller 110 provides the first control signal to the camera portion 120 in image detection mode, and provides the second control signal to the camera portion 120 in an illumination detection mode, and outputs the third control signal for adjusting the brightness of the display 140 based on the second detection signal received from the camera portion 120.

An exemplary operation of the image sensor 200 in the image detection mode according to the present invention will now be described with reference to FIG. 3A.

The image sensor 210 typically has a plurality of pixels 210 (an example shown in FIG. 3B) arranged in an N×M matrix, with each pixel typically having the same structure. Each pixel 210 includes a PhotoDiode (PD) 220, a Transfer Transistor (TT) 230, a Reset Transistor (RT) 240, a Drive Transistor (DT) 250, and a Select Transistor (ST) 260.

The PD 220 generates a photocharge by incident light received and accumulates the photocharge until the TT 230 turns on.

Still referring to FIG. 3A, the TT 230 lets the PD 220 accumulate the photocharge in an off-state and transfers the accumulated photocharge to a region (NODE) in an on-state. For this purpose, the TT 230 typically has a source connected to the PD 220, a drain connected to the NODE, and a gate for receiving a transfer signal $S_T$ for turn-on. The TT 230 may comprise a shutter transistor, as is referred to in the art.

While the TT 230 is on, the RT 240 is kept in an off-state and the NODE has a voltage by the received photocharge.

The DT 250 receives a reference voltage from a Power Supply Terminal (PST) and outputs a voltage corresponding to a gate voltage. The DT 250 functions as a general source follower. In order to function as a general source follower, the DT 250 typically has a source connected to the ST 260, a gate connected to the NODE, and a drain connected to the PST.

In an on-state, the ST 260 outputs the first detection signal with a voltage corresponding to the output voltage of the DT 250 to an output port (OUT). For this purpose, the ST 250 typically has a source connected to the OUT, a drain connected to the DT 250, and a gate for receiving a select signal $S_S$ for turn-on. After the first detection signal is output, the RT 240 is turned on and resets the voltage of the NODE to the reference voltage in the on-state. In order to accomplish this reset of the NODE voltage, the RT 240 typically has a source connected to the PST, a drain connected to the NODE, and a gate for receiving a reset signal $S_R$ for turn-on.

With reference to FIG. 3B, an operation of the image sensor 200 with the above configuration in the illumination detection mode will be described below.

While the reference voltage is applied to the PST in the image detection mode, the second detection signal is output through the PST instead of the reference voltage application as in the illumination detection mode.

The PD 220 generates a photocharge from incident light.

The TT 230 and the RT 240 are typically turned on simultaneously. While the TT 230 and the RT 240 are in the on-state, the ST 260 is kept in an off-state. The TT 230 transfers the photocharge to the NODE. The photocharge generated from the PD 220 flows from the PST via the NODE and the turned-on RT 240. The controller 110 detects the photocharge corresponding to the second detection signal and calculates a current external illumination using the detected photocharge. Because the amount of the photocharge flowing from the PST is proportional to the external illumination, the controller 110 can calculate the external illumination easily, for example, by referring to the table listing external illumination values mapped to photocharge measurements in the memory 150.

As described above, when the image sensor 200 operates in the illumination detection mode, it can be used as an illumination sensor, for example, like a PD. When needed, only part (a portion) of the pixels of the image sensor 200 can be used in the illumination detection mode. Typically, more pixels can be used to capture an image than to detect illumination. In addition, the portion of the plurality of pixels used by the image sensor to detect illumination may comprise a minimal quantity sufficient to perform a photodiode function sufficient to detect illumination so as to adjust the brightness of the display at predetermined levels.

Figure 4:
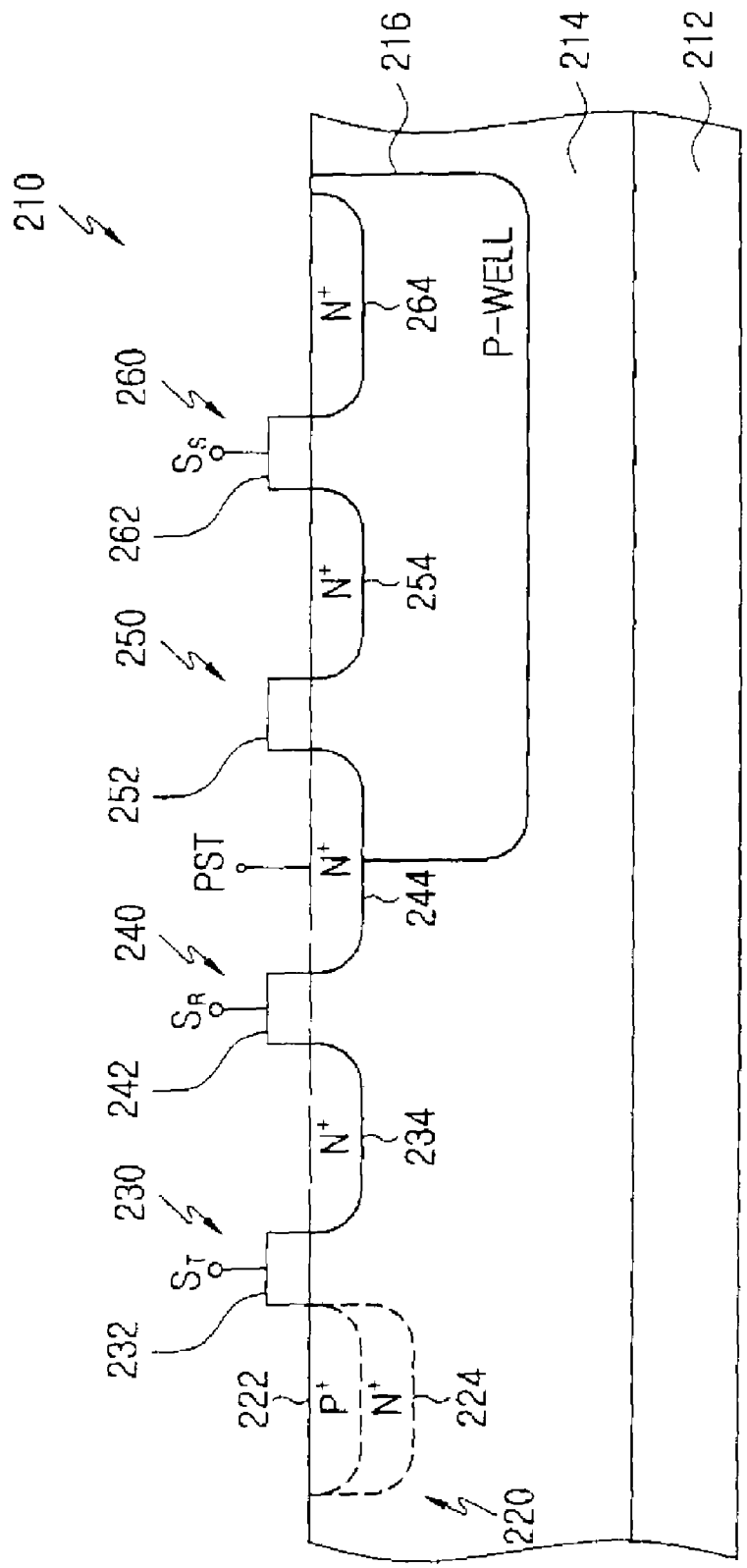
FIG. 4 is a diagram illustrating a semiconductor circuit equivalent to the circuits illustrated in FIGS. 3A and 3B.

FIG. 4 is an exemplary diagram illustrating a semiconductor circuit equivalent to the circuits illustrated in FIGS. 3A and 3B.

Referring to FIG. 4, each pixel 210 of the image sensor 200 typically includes a semiconductor substrate 212, a P-type epitaxial layer 210 deposited on the semiconductor substrate 212, a first gate electrode 232 of the TT 230 arranged on the P-type epitaxial layer 214, a second gate electrode 242 of the RT 240, a third gate electrode 252 of the DT 250 and a fourth gate electrode 264 of the ST 260. The PD 220 having an N+ diffusion region 224 and a P+ diffusion region 222 and forming a PNP junction structure with the P-type epitaxial layer 214, a P-type well 216, an N+ node region 234, and N+ source/drain regions 244, 254 and 264 are formed on the P-type epitaxial layer 214. The source/drain region 244 between the second and third electrodes 242 and 252 is connected to the PST.

Figure 5A:
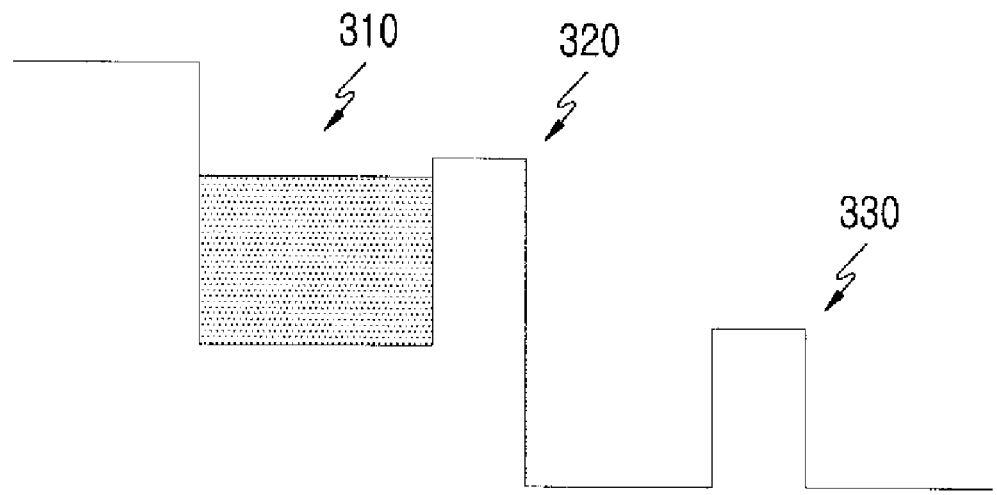
FIGS. 5A and 5B are band diagrams of the semiconductor circuit illustrated in FIG. 4.
Figure 5B:
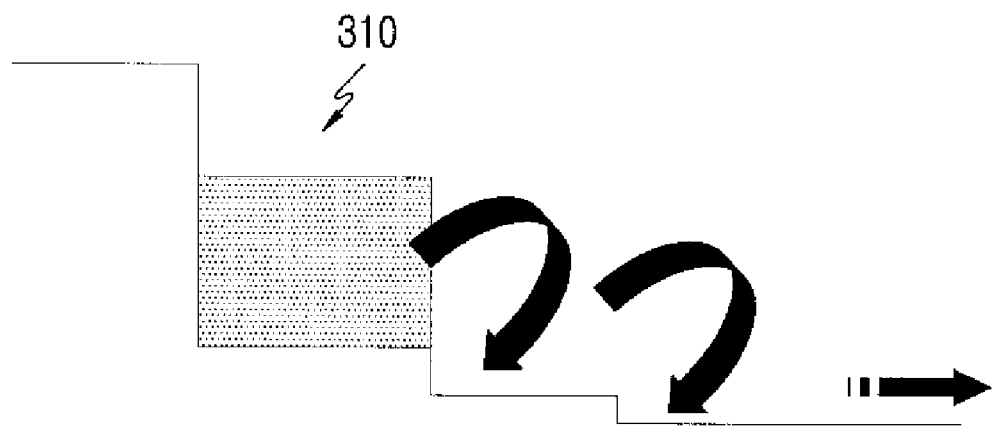

FIGS. 5A and 5B are band diagrams of the exemplary semiconductor circuit illustrated in FIG. 4. Specifically, FIG. 5A is a band diagram in the case where the TT 230 and the RT 240 are turned off simultaneously. In this case, photocharge 310 generated from the PD 220 is blocked by a first energy barrier 320 of the TT 230 and a second energy barrier 330 of the RT 240.

FIG. 5B is a band diagram in the case where the TT 230 and the RT 240 are turned on simultaneously. In this case, the first and second energy barriers become so low that the photocharge 310 can be transferred.

As is apparent from the above description, the display apparatus of the present invention selectively detects an image or external illumination using the image sensor. Therefore, the display apparatus can automatically its display brightness according to the external illumination without using additional parts.

While the invention has been shown and described with reference to certain exemplary embodiments of the present invention thereof, it will be understood by those skilled in the art that various changes in form and details may be made therein without departing from the spirit and scope of the present invention as defined by the appended claims. For example, while it is preferred that the pixels in the image sensor have the same structure, there can be pixels of the image sensor having similar, or even different structures, some of which can be more suitable to capture an image and others more suitable for providing a photodiode function. Also, while the exemplary embodiments of the invention discuss the camera portion having a dual use image sensor capturing an image or detecting illumination depending upon the generated control signal, it is within the spirit and scope of the invention that the memory can store a previously captured or downloaded images that are displayed by the display and the camera portion generates the second signal for controlling brightness of the display while displaying the previously stored or downloaded image. The memory can serve as a buffer as well as a storage of programs for retrieving still or moving images.

What is claimed is:

1. A display apparatus comprising:
    a camera portion comprising a dual-mode image sensor for generating a first detection signal by capturing an image of an object according to a first control signal in an image detection mode and for generating a second detection signal by detecting external illumination according to a second control signal in an illumination mode;
    a display for displaying an image signal of the image captured by the camera portion in the image detection mode; and
    a controller for outputting the first control signal to the camera portion in the image detection mode, and for outputting the second control signal to the camera portion in the illumination detection mode, and for controlling brightness of the display based on the second detection signal received from the camera portion representing the external illumination detected;
    wherein the image sensor includes a plurality of pixels having the same structure, each pixel comprising:
    a photodiode for generating a photocharge from incident light;
    a select transistor for outputting the first detection signal with a voltage corresponding to a voltage induced by the photocharge accumulated in a node region in the image detection mode; and
    a reset transistor for resetting a voltage of the node region to a reference voltage applied to a power supply terminal in the image detection mode and outputting the second detection signal having a voltage corresponding to the voltage of the node region through the power supply terminal in the illumination detection mode.

2. The apparatus of claim 1, wherein each pixel further comprises a transfer transistor for transferring the photocharge to the node region in an on-state, and the reset transistor and the transfer transistor are maintained in the on- state simultaneously in the illumination detection mode.

3. The apparatus of claim 1, wherein each pixel further comprises a drive transistor for receiving the reference voltage through the power supply terminal in the image detection mode and outputting the voltage corresponding to the voltage induced by the photocharge accumulated in the node region, and an output of the select transistor comprises the first detection signal with a voltage corresponding to an output voltage of the drive transistor.

4. The apparatus of claim 1, further comprising an image signal processor for converting the first detection signal received from the camera portion to an image signal and providing the image signal to the display.

5. The apparatus of claim 1, further comprising a memory in communication with said controller, wherein an image previously stored in said memory is displayed by said display and said camera portion generating the second detection signal for controlling brightness of the display while displaying the previously stored image.

6. The apparatus of claim 1, wherein the reference voltage is applied to the power supply terminal, the reset transistor is turned off and the select transistor is turned on for generating the first detection signal in the image detection mode, and
    wherein the reference voltage is not applied to the power supply terminal, the reset transistor is turned on and the select transistor is turned off for generating the second detection signal in the illumination detection mode.

* * * * *